US012795213B2

(12) United States Patent
Davis et al.

(10) Patent No.: US 12,795,213 B2
(45) **Date of Patent: *Nov. 10, 2026**

(54) METHODS AND APPARATUS TO USE STATION IDENTIFICATION TO ENABLE CONFIRMATION OF EXPOSURE TO LIVE MEDIA

(71) Applicant: The Nielsen Company (US), LLC, New York, NY (US)

(72) Inventors: Jeremey M. Davis, New Port Richey, FL (US); Christen V. Nielsen, Dunedin, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/018,288

(22) Filed: Jan. 13, 2025

(65) Prior Publication Data

US 2025/0150688 A1 May 8, 2025

Related U.S. Application Data

(63) Continuation of application No. 18/426,135, filed on Jan. 29, 2024, now Pat. No. 12,238,393, which is a continuation of application No. 18/092,266, filed on Dec. 31, 2022, now Pat. No. 11,917,267, which is a continuation of application No. PCT/US2021/040691, filed on Jul. 7, 2021, which is a continuation of application No. 16/937,301, filed on Jul. 23, 2020, now Pat. No. 11,343,592.

(51) Int. Cl.

*H04N 21/8358* (2011.01)
*H04N 21/2187* (2011.01)
*H04N 21/24* (2011.01)
*H04N 21/845* (2011.01)

(52) U.S. Cl.

CPC ..... *H04N 21/8358* (2013.01); *H04N 21/2187* (2013.01); *H04N 21/2407* (2013.01); *H04N 21/845* (2013.01)

(58) Field of Classification Search

None

See application file for complete search history.

(56) References Cited

U.S. PATENT DOCUMENTS

| | | | | |
|---|---|---|---|---|
| 9,668,020 | B2 * | 5/2017 | Nelson | H04N 21/44213 |
| 10,097,872 | B2 * | 10/2018 | McMillan | H04N 21/8456 |
| 2007/0271300 | A1 * | 11/2007 | Ramaswamy | H04N 21/266 |

* cited by examiner

*Primary Examiner* — Cai Y Chen

(57) ABSTRACT

Methods, apparatus, systems and articles of manufacture are disclosed to use station identification to enable confirmation of exposure to live media. Example apparatus disclosed herein include a watermark data segmenter to determine a media identifier conveyed by a watermark, a detection time determiner to determine a time at which a media meter detected the watermark from a media presentation by a media device, a reference identifier to query a library of reference signatures for a reference signature associated with the media identifier of the watermark and associated with a reference timestamp corresponding to the time at which the media meter detected the watermark, and a viewing type determiner to determine whether the media presentation is live or time-shifted based on whether a result of the query indicates the reference signature does not exist in the library of reference signatures.

20 Claims, 5 Drawing Sheets

METHODS AND APPARATUS TO USE STATION IDENTIFICATION TO ENABLE CONFIRMATION OF EXPOSURE TO LIVE MEDIA

RELATED APPLICATIONS

This patent arises from a continuation of U.S. patent application Ser. No. 18/426,135, now U.S. Pat. No. 12,238,393, which was filed on Jan. 29, 2024, which is a continuation of U.S. patent application Ser. No. 18/092,266, now U.S. Pat. No. 11,917,267, which was filed on Dec. 31, 2022, which is a continuation of International Patent Application No. PCT/US2021/040691, which was filed on Jul. 7, 2021, which is a continuation of U.S. patent application Ser. No. 16/937,301, now U.S. Pat. No. 11,343,592, which was filed on Jul. 23, 2020. U.S. patent application Ser. No. 18/426,135, U.S. patent application Ser. No. 18/092,266, International Patent Application No. PCT/US2021/040691 and U.S. patent application Ser. No. 16/937,301 are hereby incorporated herein by reference in their respective entireties. Priority to U.S. patent application Ser. No. 18/426,135, U.S. patent application Ser. No. 18/092,266, International Patent Application No. PCT/US2021/040691 and U.S. patent application Ser. No. 16/937,301 is hereby claimed.

FIELD OF THE DISCLOSURE

This disclosure relates generally to media identification systems, and, more particularly, to methods and apparatus to use station identification to enable confirmation of exposure to live media.

BACKGROUND

Audience viewership data is collected and used by media monitoring entities to determine exposure statistics (e.g., viewership statistics) for different media. Some audience viewership data may be collected through device meters that detect media watermarks and/or generate media signatures associated with media presented via media presentation devices. Information from the device meters are processed by the media monitoring entities to determine useful media exposure data and associated statistics.

BRIEF DESCRIPTION OF THE DRAWINGS

The figures are not to scale. In general, the same reference numbers will be used throughout the drawing(s) and accompanying written description to refer to the same or like parts.

Figure 1:
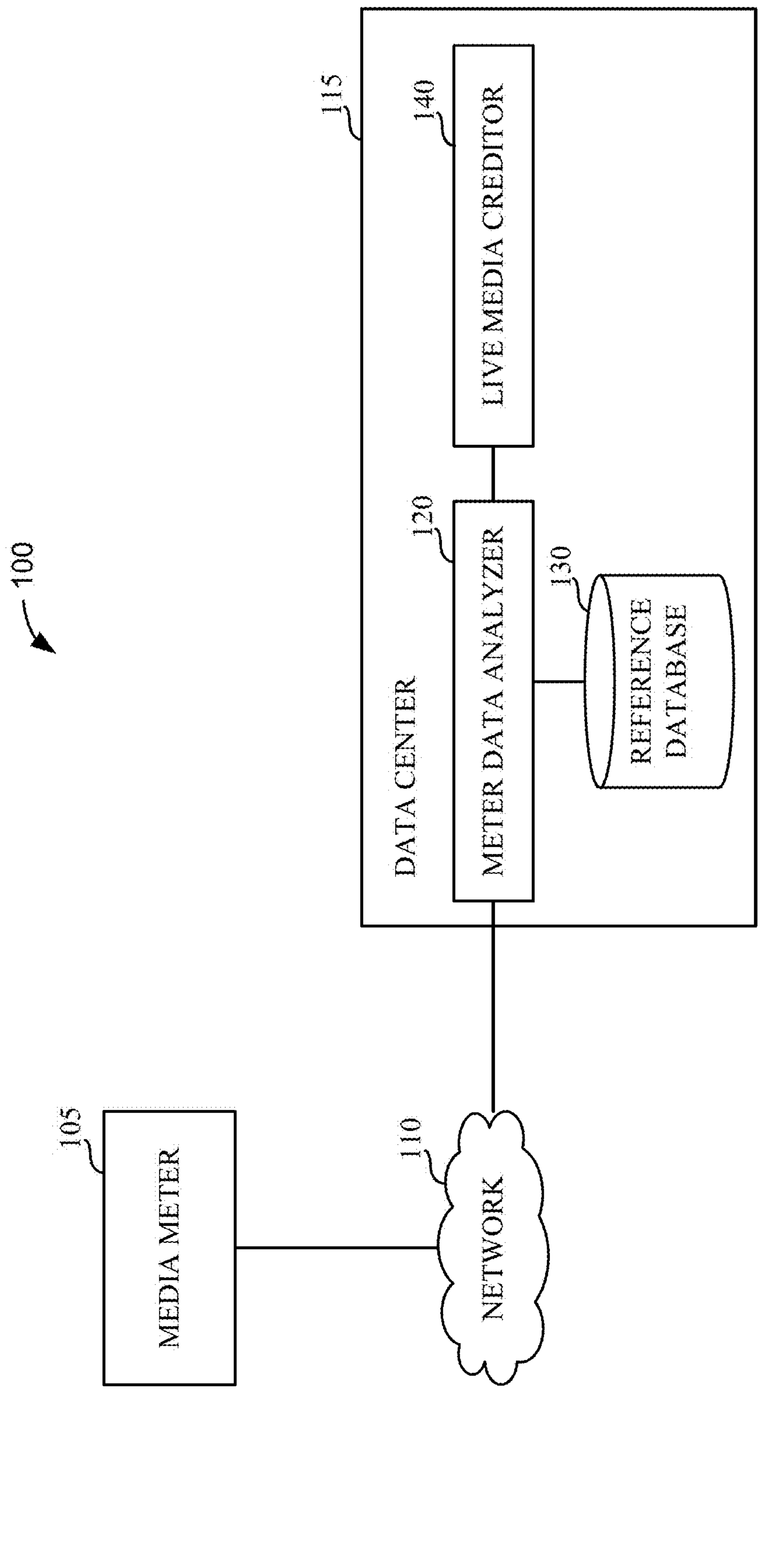
FIG. 1 is a block diagram of an example environment in which the teachings of this disclosure may be implemented.

Unless specifically stated otherwise, descriptors such as “first,” “second,” “third,” etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor “first” may be used to refer to an element in the detailed description, while the same element may be referred to in a claim with a different descriptor such as “second” or “third.” In such instances, it should be understood that such descriptors are used merely for identifying those elements distinctly that might, for example, otherwise share a same name. As used herein “substantially real time” refers to occurrence in a near instantaneous manner recognizing there may be real world delays for computing time, transmission, etc. Thus, unless otherwise specified, “substantially real time” refers to real time+/−1 second.

DETAILED DESCRIPTION

As used herein, the term “media” includes any type of content and/or advertisement delivered via any type of distribution medium. Thus, media includes television programming or advertisements, radio programming or advertisements, movies, web sites, streaming media, etc.

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

In some examples, media monitoring information is aggregated to determine ownership and/or usage statistics of media devices, determine the media presented by the media devices, determine audience ratings, determine relative rankings of usage and/or ownership of media devices, determine types of uses of media devices (e.g., whether a device is used for browsing the Internet, streaming media from the Internet, etc.), and/or determine other types of media device information. In examples disclosed herein, monitoring information includes, but is not limited to, one or more of media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.), etc.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media source feeds. Various comparison criteria, such as a cross-correlation value, a Hamming distance, etc., can be evaluated to determine whether a monitored signature matches a particular reference signature. When a match between the monitored signature and a reference signature is found, the monitored media can be identified as corresponding to the particular reference media represented by the reference signature that matched with the monitored signature. Because attributes, such as an identifier of the media, a presentation time, a broadcast channel, etc., are collected for the reference signature(s), these attributes may then be associated with the monitored media whose monitored signature matched the reference signature(s).

Media monitoring entities can generate media reference databases that can include unhashed signatures, hashed signatures, and watermarks. These references are generated by a media monitoring entity (e.g., at a media monitoring station (MMS), etc.) by monitoring a media source feed, identifying any encoded watermarks and determining signatures associated with the media source feed. In some examples, the media monitoring entity can hash the determined signatures. A media monitoring entity may additionally or alternatively generate reference signatures for downloaded reference media, reference media transmitted to the media monitoring entity from one or more media providers, etc.

In some examples, media monitoring entities store generated reference databases and gathered monitoring data on cloud storage services (e.g., Amazon Web Services™, etc.). To allow the crediting of time-shifted viewing (e.g., viewing media via a digital video recorder (DVR), etc.), the stored references are retained for a period of time after the initial presentation of the media.

In some examples, audio watermarking is used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component of the media. In some examples, the watermark is embedded in the audio or video component so that the watermark is hidden.

As used herein, the terms “code” or “watermark” are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header).

In some examples, to identify watermarked media, the watermark(s) are extracted and used to access a table of reference watermarks that are mapped to media identifying information. In some examples, media monitoring companies provide watermarks and watermarking devices to media providers with which to encode their media source feeds. In some examples, if a media provider provides multiple media source feeds (e.g., ESPN and ESPN 2, etc.), a media provider can provide a different watermark for each media source feed.

In some examples, a user may be exposed to watermarked media in environments with ambient noise (e.g., background noises, conversations, etc.). In some such environments, media monitoring meters that use microphones to detect media exposure (e.g., audio meters) can have difficulty with accurately capturing watermarks in the audio signals. In some examples, the audio meters detect watermarks in a watermarked audio signal and process the watermark to identify the media identifier(s) and timestamp associated with the watermarked media. In some examples, the media identifier is a station identification (ID). In some examples, the station ID identifies the broadcaster of the media (e.g., ABC, Fox, etc.), and the timestamp identifies when the media was broadcasted (e.g., 7 PM Eastern, etc.). In some examples, media identifier(s) of the watermark include other media identifiers in addition to the station ID (e.g., program identifiers, episode identifiers, etc.). The timestamp data of watermarked media can be vulnerable to interference from ambient noise. For example, the station ID may be repeated in multiple watermarks encoded in the watermarked media, and such repetition can be used to improve the detection rate of the station ID. However, the timestamp data may not be repeated and, thus, may be more susceptible to decoding errors in the presence of ambient noise. In such examples, the media monitoring entity may be unable to reliably report the encoded timestamp of a media watermark because a media monitoring meter (e.g., an audio meter) is able to decode a station ID of the media watermarks in an environment with ambient noise but is unable to decode the timestamp(s) of one or more watermarks. In such examples, the media monitoring entity is unable to identify the watermarked media as live or time-shifted. In some examples, live media refers to media that is detected by a meter at the scheduled broadcasting time for the media. In some examples, time-shifted media refers to media that is detected by a meter outside of the scheduled broadcasting time for the media (e.g., when the media is recorded and then presented at a later time).

Examples disclosed herein improve media monitoring reliability in environments that contain ambient noise. Examples disclosed herein use the station ID from an identified watermark in conjunction with signature based matching to determine the presentation time characteristic(s) of the media (e.g., live or time-shifted). In some examples, the media meter generates and reports signatures and also decodes watermarks from media signals (e.g., media audio signal). In such examples, the media monitoring entity can run a signature match using the station ID decoded from the watermark to determine if the monitored media is live or time-shifted without needing to decode the timestamp of the watermark. Examples disclosed herein use the station ID during signature matching to reduce the number of false positives during the signature matching process. In some examples, the station ID focuses the signature matching lookup, which makes the signature matching less process intensive and more reliable. Examples disclosed herein allow leveraging the information from the detected watermarks in a challenging acoustic environment.

FIG. 1 is a block diagram of an example environment in which the teachings of this disclosure may be implemented. The example environment 100 of FIG. 1 includes an example media meter 105, an example network 110, and an example data center 115. The example data center 115 includes an example meter data analyzer 120, an example reference database 130, and an example live media creditor 140.

In the illustrated example of FIG. 1, the example media meter 105 collects media monitoring information. In some examples, the media meter 105 is associated with (e.g., installed on, coupled to, etc.) a media device. For example, a media device associated with the media meter 105 presents media (e.g., via a display, etc.). In some examples, the media device associated with the media meter 105 additionally or alternatively presents the media on separate media presentation equipment (e.g., speakers, a display, etc.). For example, the media device associated with the media meter 105 can include a personal computer, an Internet-enabled mobile handset (e.g., a smartphone, an iPod®, etc.), a video game console (e.g., Xbox®, PlayStation 3, etc.), a tablet computer (e.g., an iPad®, a Motorola™ Xoom™, etc.), a digital media player (e.g., a Roku® media player, a Slingbox®, a Tivo®, etc.), a television, a desktop computer, a laptop computer, a server, etc. In some examples, the media meter 105 can have direct connections (e.g., physical connections) to the media device to be monitored, and/or may be connected wirelessly (e.g., via Wi-Fi, via Bluetooth, etc.) to the media device to be monitored.

Additionally or alternatively, in some examples, the media meter 105 is a portable meter carried by one or more individual people. In the illustrated example, the media meter 105 monitors media presented to one or more people associated with the media meter 105 and generates monitoring data. In some examples, the monitoring data generated by the media meter 105 can include watermarks embedded in the audio signals of the presented media. In some examples, the media meter 105 can detect/decode the watermarks embedded in the audio signals. In some examples, the media meter 105 can generate signatures associated with the presented media while also decoding the watermarks from the presented media. For example, the media meter 105 can determine a signature (e.g., generate signatures, extract signatures, etc.) associated with the presented media that included the embedded watermark.

The example network 110 of the illustrated example of FIG. 1 is a network used to transmit the monitoring data to the data center 115. In some examples, the network 110 can be the Internet and/or any other suitable external network. In some examples, any other suitable means of transmitting the monitoring data to the data center 115 can be used.

The example data center 115 of the illustrated example of FIG. 1 is an execution environment used to implement the example meter data analyzer 120, the example reference database 130, and the example live media creditor 140. In some examples, the data center 115 is associated with a media monitoring entity. In some examples, the data center 115 can be a physical processing center (e.g., a central facility of the media monitoring entity, etc.). Additionally or alternatively, the data center 115 can be implemented via a cloud service (e.g., Amazon Web Services™, etc.). In this example, the data center 115 can further store and process reported watermark and signature reference data.

The example meter data analyzer 120 of the illustrated example of FIG. 1 processes the gathered media monitoring data to detect and identify media associated with the monitoring data from the example media meter 105. In some examples, the meter data analyzer 120 collects the station ID and timestamp from the monitoring data generated by the example media meter 105. In some examples, the meter data analyzer 120 receives the watermark payload data (e.g., data symbols) in the monitoring data generated by the example media meter 105. In such examples, the meter data analyzer 120 decodes the watermark data in the monitoring data to determine the station ID and timestamp. Additionally or alternatively, the meter data analyzer 120 decodes the watermark data in the monitoring data to determine other media identifiers (e.g., program identifier, episode identifier, etc.). In some examples, the meter data analyzer 120 determines that the monitoring data experienced interference and/or other errors in decoding the timestamp of the watermark, and the example meter data analyzer performs a signature matching search with the station ID of the watermark to determine a detection time for the media associated with the watermark. However, the meter data analyzer 120 can additionally or alternatively perform a signature matching search with the other media identifiers. An example implementation of the meter data analyzer 120 is described below in conjunction with FIG. 2.

The example reference database 130 of the illustrated example of FIG. 1 includes generated reference signatures created or otherwise obtained by the example data center 115. In some examples, the media monitoring entity associated with the reference database 130 can directly monitor media source feeds to generate reference signatures. Additionally or alternatively, the media monitoring entity associated with the reference database 130 can generate reference signatures from downloaded reference media, etc. In some examples, each reference signature stored in the reference database 130 is associated with a particular reference media, such as, but not limited to, an episode of a television series, a movie, an advertisement, etc. In some examples, each reference signature stored in the reference database 130 is associated with a timestamp, which indicates a time associated with the reference signature, such as a broadcast time of the reference media or portion thereof represented by the reference signature, a time within the reference media (e.g., a time in content) represented by the reference signature, a time at which the reference signature was generated, etc. In some examples, the reference signature can be associated with multiple timestamps representative of such different times. In some examples, the reference database 130 can include a library (e.g., database, table, etc.) of reference signatures.

The example live media creditor 140 of the illustrated example of FIG. 1 uses identification data from the example meter data analyzer 120 to credit the media exposure as either live or time-shifted. In some examples, the live media creditor 140 generates a report including data metrics regarding live or time-shifted media that may be presented to media providers.

Figure 2:
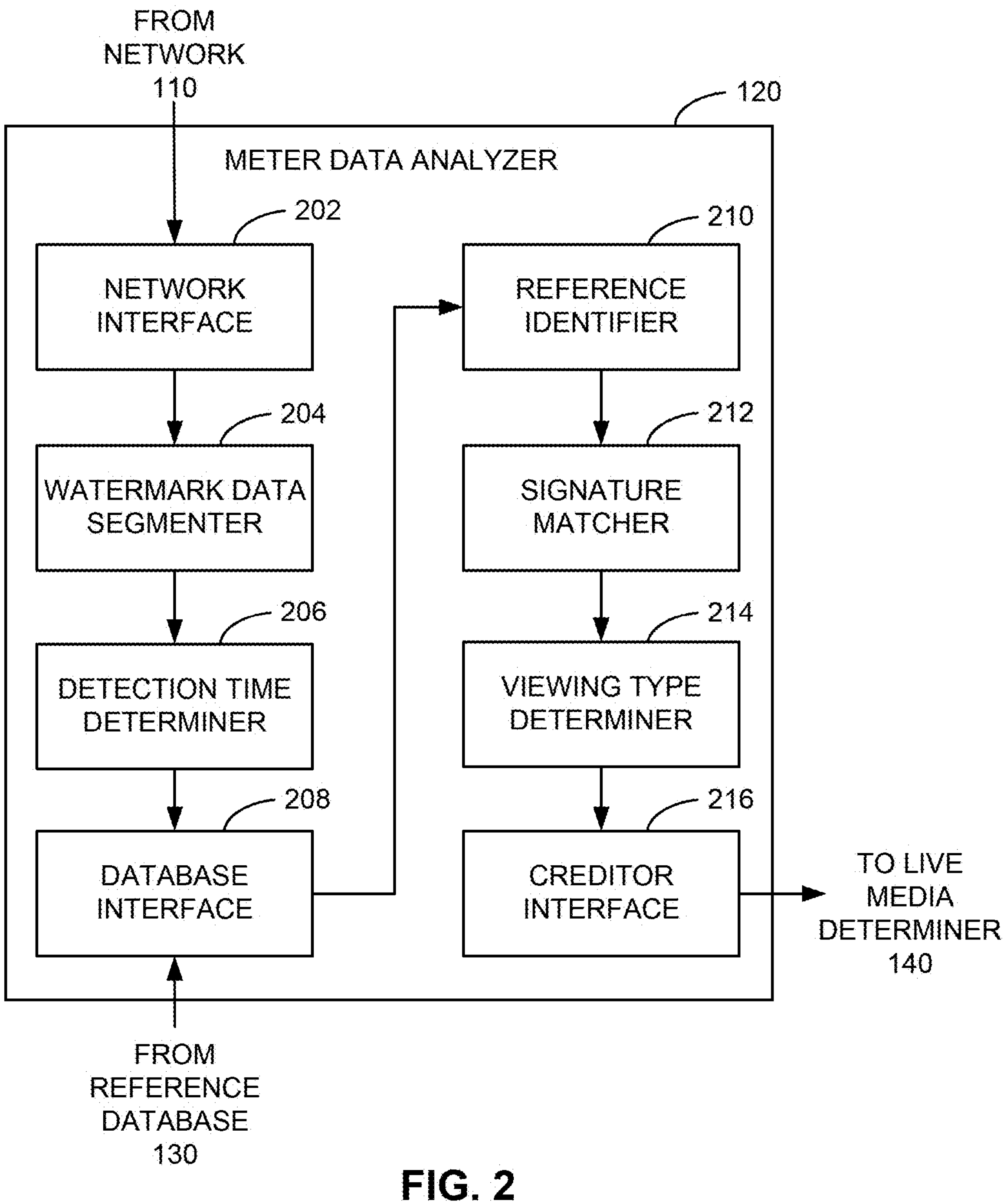
FIG. 2 is a block diagram of an example meter data analyzer included in the example environment of FIG. 1.

FIG. 2 is a block diagram of an example implementation of the example meter data analyzer 120 of FIG. 1. The example meter data analyzer 120 of FIG. 2 includes an example network interface 202, an example watermark data segmenter 204, an example detection time determiner 206, an example database interface 208, an example reference identifier 210, an example signature matcher 212, an example viewing type determiner 214, and an example creditor interface 216.

The example network interface 202 of the illustrated example FIG. 2 allows the example meter data analyzer 120 of FIG. 1 to receive the monitoring data from the example network 110. In some examples, the network interface 202 can convert the monitoring data into a format readable by the meter data analyzer 120. In some examples, the network interface 202 can be in continuous communication with the network 110 and/or the media meter 105. In some examples, the network interface 202 can be in intermittent (e.g., periodic or aperiodic) communication with the network 110 and/or the media meter 105. In some examples, the network interface 202 can be absent. In such examples, the media meter 105 can be in direct communication with the meter data analyzer 120. For example, if the example meter data analyzer 120 is implemented via a cloud service, the media meter 105 can upload the monitoring data directly to the cloud service. In some examples, the network interface 202 obtains a media watermark from the monitoring data. In some examples, the network interface 202 obtains the station ID and timestamp of the decoded media watermark from the monitoring data. In some examples, the network interface 202 obtains the watermark symbols from the monitoring data and decodes the symbols to determine the station ID, timestamp, etc. Additionally or alternatively, the network interface 202 obtains other media identifiers (e.g., program identifier, episode identifier, etc.) from the media watermark.

The example watermark data segmenter 204 of the illustrated example of FIG. 2 obtains the watermark data from the example network interface 202. In some examples, the watermark data segmenter 204 identifies the station ID from the decoded watermark. In some examples, the watermark data segmenter 204 decodes the watermark symbol to identify the station ID of the watermark. However, the watermark data segmenter 204 can additionally or alternatively identify the other media identifiers of the watermark.

In the illustrated example of FIG. 2, the example detection time determiner 206 determines the time of detection for the watermark. In some examples, the media meter 105 of the example of FIG. 1 records the time (e.g., time of day) at which the watermark was detected in a monitored audio signal. In such examples, the example media meter 105 includes the time of detection in the monitoring data obtained by the network interface 202. In some examples, the detection time determiner 206 obtains the time of detection recorded by the example media meter 105.

The example database interface 208 of the illustrated example of FIG. 2 obtains example reference signatures from the example reference database 130. In some examples, the database interface 208 provides the example reference identifier 210 with access to the example reference signatures stored in the example reference database 130.

The example reference identifier 210 of the illustrated example of FIG. 2 identifies reference signatures in the example reference database 130 that are associated with reference information corresponding to the watermark data. For example, the reference identifier 210 identifies if any reference signatures stored in the reference database 130 are associated with the station identifier of the watermark. In some examples, the reference identifier 210 queries a library of reference signatures for reference signature(s) associated with the station ID of the watermark. However, the reference identifier 210 can additionally or alternatively query the library of reference signatures for reference signature(s) associated with the other media identifiers of the watermark (e.g., program identifier, episode identifier, etc.). In some examples, the reference identifier 210 determines if any of the identified reference signatures having the same station ID as the watermark are associated with a reference timestamp that corresponds to the watermark time of detection. For example, the reference identifier 210 queries the identified reference signatures with the same station ID for a reference signature that is associated with a reference timestamp that represents a media presentation time (e.g., a broadcast time, a download time, etc.) corresponding to the time at which the media meter 105 detected the watermark. In such examples, "corresponding to" refers to the reference timestamp being within a tolerance or threshold of time from the watermark time of detection (e.g., the difference in time between the reference timestamp and the watermark time of detection satisfies the threshold). For example, the tolerance or threshold of time may be within three seconds, five seconds, etc. If the example reference identifier 210 determines that an identified reference signature is associated with a reference timestamp that corresponds to the watermark time of detection, then the reference identifier 210 identifies the reference signature with similar reference information. In some examples, the reference identifier 210 provides the information of the reference signature to the example signature matcher 212. In some examples, the reference identifier 210 identifies a sequence of reference signatures with similar reference information. If the example reference identifier 210 determines that none of the identified reference signatures are associated with the reference times corresponding to the watermark time of detection, then the example reference identifier 210 does not identify any reference signatures. In some examples, the reference identifier 210 provides the signature matcher 212 with no reference signatures.

The example signature matcher 212 of the illustrated example of FIG. 2 determines if the reference identifier 210 identified a reference signature or sequence of reference signatures. If the signature matcher 212 does not receive an identified reference signature or sequence of identified reference signatures, then the signature matcher 212 does not perform signature matching and does not provide the example viewing type determiner 214 with a successful match. If the signature matcher 212 receives an identified reference signature or sequence of identified reference signatures, then the signature matcher 212 performs signature matching between the identified reference signature from the example reference identifier 210 and the monitored media signatures from the example media meter 105 of FIG. 1. In some examples, the media meter 105 can generate monitored media signatures associated with the presented media while also decoding the watermark from the presented media. For example, the monitoring data from the media meter 105 can include monitored media signatures that were generated by the media meter 105 for the presented media that included the watermark. The signature matcher 212 compares the monitored media signatures in the monitoring data to the identified reference signature or sequence of identified reference signatures from the example reference identifier 210. For example, the signature matcher 212 can determine if the monitored media signatures of the monitoring data match the reference data of the identified reference signatures. In some examples disclosed herein, the signature matcher 212 may perform matching using any suitable means (e.g., linear matching, hashed matching, etc.).

In the illustrated example of FIG. 2, the example viewing type determiner 214 determines if the signature matching was successful. In some examples, the viewing type determiner 214 determines that the signature matching was successful when the example signature matcher 212 provides a matching reference signature or sequence of matching reference signatures to the viewing type determiner 214. For example, the viewing type determiner 214 determines that the signature matching was successful when the example signature matcher 212 matches the identified reference signature or sequence of identified reference signatures from the reference identifier 210 to the monitored media signatures from the example media meter 105. In some examples, the viewing type determiner 214 determines that the signature matching was not successful when the example signature matcher 212 does not provide a matching reference signature or sequence of matching reference signatures to the viewing type determiner 214. For example, the viewing type determiner 214 determines that the signature matching was not successful when the example signature matcher 212 does not match the identified reference signature or sequence of identified reference signatures from the reference identifier 210 to the monitored media signatures from the example media meter 105. If the example viewing type determiner 214 determines that signature matching was successful, then the viewing type determiner 214 identifies the watermarked media as live. If the example viewing type determiner 214 determines that the signature matching was not successful, then the viewing type determiner 214 identifies the watermarked media as time-shifted. The example viewing type determiner 214 provides the example creditor interface 216 with the live identification or the time-shifted identification for the watermarked media.

In the illustrated example of FIG. 2, the example creditor interface 216 credits the watermarked media as either live or time-shifted based on the output of the example viewing type determiner 214. The example creditor interface 216 generates identification data for the watermarked media based on the output of the example viewing type determiner 214. In some examples, the creditor interface 216 transmits the identification data to the live media creditor 140.

While an example manner of implementing the example meter data analyzer 120 of FIG. 1 is illustrated in FIG. 2, one or more of the elements, processes and/or devices illustrated in FIG. 2 may be combined, divided, re-arranged, omitted, eliminated and/or implemented in any other way. Further, the example network interface 202, the example watermark data segmenter 204, the example detection time determiner 206, the example database interface 208, the example reference identifier 210, the example signature matcher 212, the example viewing type determiner 214, the example creditor interface 216 and/or, more generally, the example meter data analyzer 120 of FIG. 2 may be implemented by hardware, software, firmware and/or any combination of hardware, software and/or firmware. Thus, for example, any of the example network interface 202, the example watermark data segmenter 204, the example detection time determiner 206, the example database interface 208, the reference identifier 210, the example signature matcher 212, the example viewing type determiner 214, the example creditor interface 216 and/or, more generally, the example meter data analyzer 120 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 202, the example watermark data segmenter 204, the example detection time determiner 206, the example database interface 208, the reference identifier 210, the example signature matcher 212, the example viewing type determiner 214, and/or the example creditor interface 216 is/are hereby expressly defined to include a non-transitory computer readable storage device or storage disk such as a memory, a digital versatile disk (DVD), a compact disk (CD), a Blu-ray disk, etc. including the software and/or firmware. Further still, the example meter data analyzer 120 of FIG. 2 may include one or more elements, processes and/or devices in addition to, or instead of, those illustrated in FIGS. 3 and 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
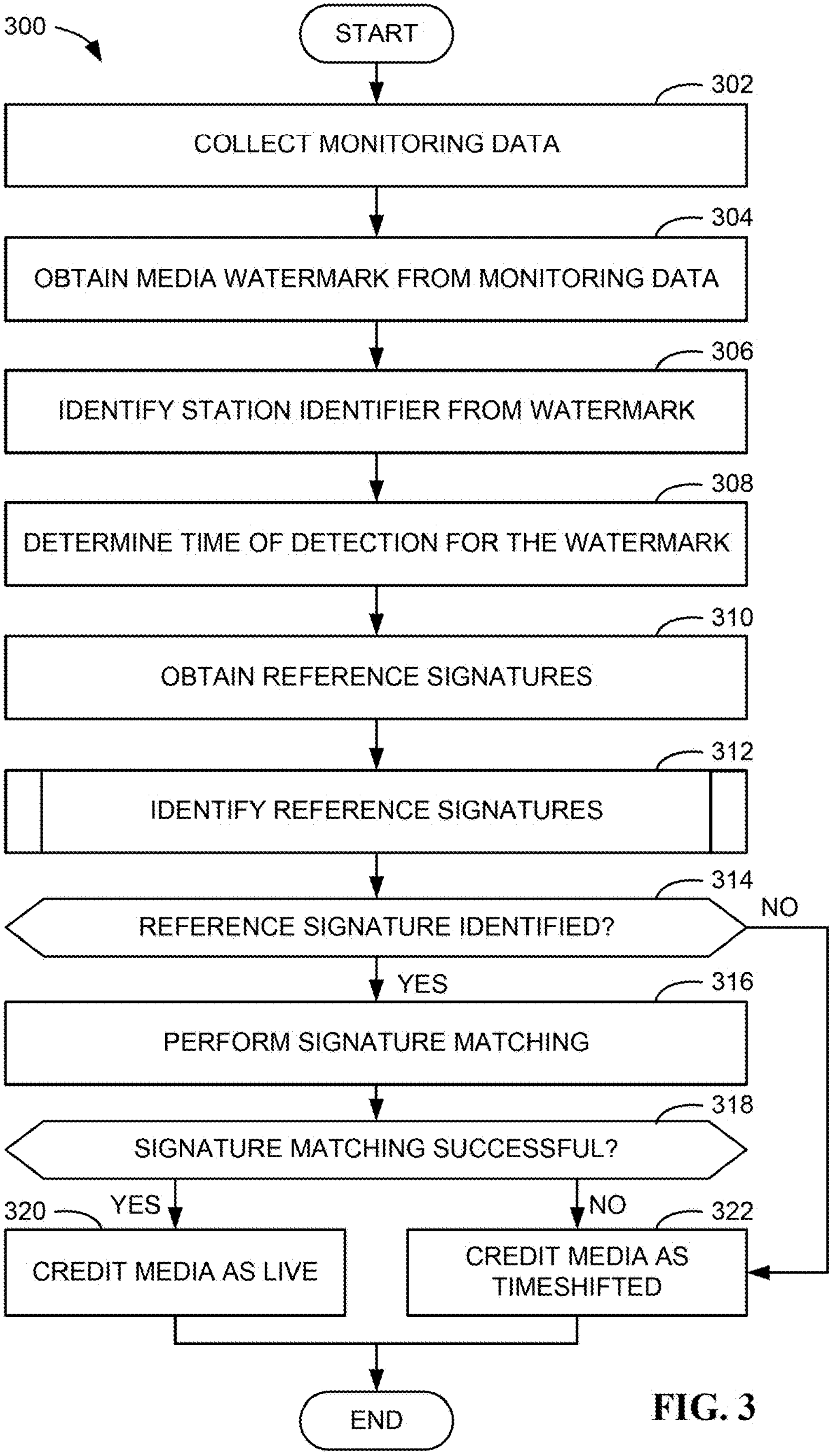
FIG. 3 is a flowchart representative of example machine readable instructions which may be executed to implement the example meter data analyzer of FIGS. 1 and/or 2.
Figure 4:
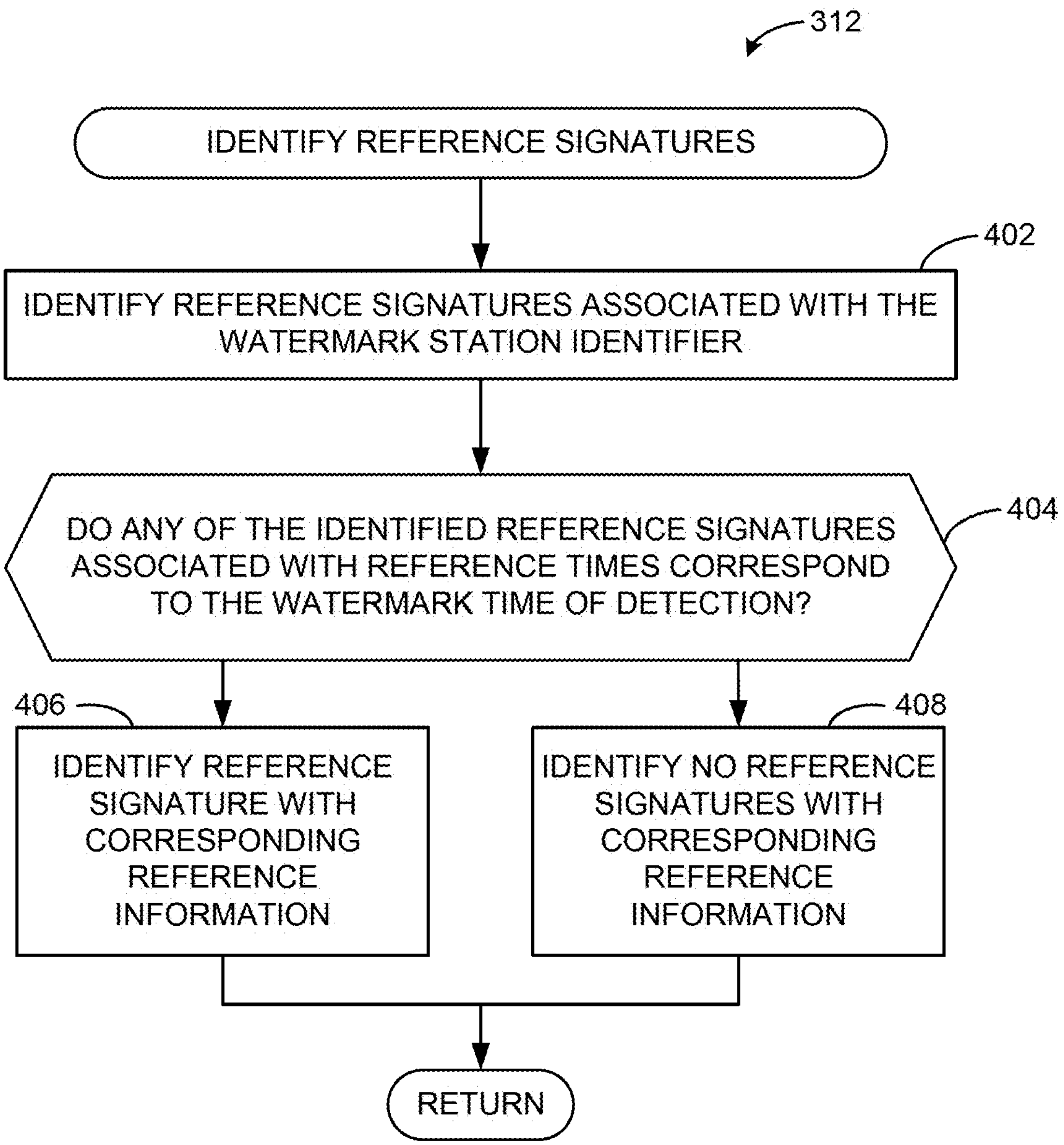
FIG. 4 is a flowchart representative of example machine readable instructions which may be executed to implement the example reference identifier included in the example meter data analyzer of FIGS. 1 and/or 2.

Flowcharts representative of example hardware logic, machine readable instructions, hardware implemented state machines, and/or any combination thereof for implementing the meter data analyzer 120 of FIG. 2 are shown in FIGS. 3 and 4. The machine readable instructions may be one or more executable programs or portion(s) of an executable program for execution by a computer processor and/or processor circuitry, such as the processor 512 shown in the example processor platform 500 discussed below in connection with FIG. 5. The program(s) may be embodied in software stored on a non-transitory computer readable storage medium such as a CD-ROM, a floppy disk, a hard drive, a DVD, a Blu-ray disk, or a memory associated with the processor 512, but the entire program(s) and/or parts thereof could alternatively be executed by a device other than the processor 512 and/or embodied in firmware or dedicated hardware. Further, although the example program(s) is(are) described with reference to the flowchart illustrated in FIGS. 4-5, many other methods of implementing the example meter data analyzer 120 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3 and 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart representative of machine readable instructions which may be executed to implement the example meter data analyzer 120 of FIG. 2. The program 300 of FIG. 3 begins execution at block 302 at which the example network interface 202 collects monitoring data from the example network 110. In some examples, the network interface 202 can be in continuous communication with the network 110 and/or the media meter 105. In some examples, the network interface 202 can be in intermittent (e.g., periodic or aperiodic) communication with the network 110 and/or the media meter 105. At block 304, the example network interface 202 obtains a media watermark from the monitoring data. In some examples, the network interface 202 obtains the station ID and timestamp of the decoded media watermark from the monitoring data. In some examples, the network interface 202 obtains the watermark data symbols (e.g., watermark payload data) from the monitoring data.

At block 306, the example watermark data segmenter 204 identifies the station identifier from the watermark. In some examples, the watermark data segmenter 204 obtains the watermark data from the example network interface 202. In some examples, the watermark data segmenter 204 identifies the station ID from the decoded watermark. In some examples, the watermark data segmenter 204 decodes the watermark symbol to identify the station ID of the watermark. In the illustrated example, the watermark data segmenter 204 provides the station ID to the detection time determiner 206.

At block 308, the example detection time determiner 206 determines a time of detection for the watermark. In some examples, the media meter 105 of the example FIG. 1 records the time that the watermark was detected in a monitored media signal (e.g., a monitored audio signal). In such examples, the example media meter 105 includes the time of detection in the monitoring data obtained by the network interface 202. In some examples, the detection time determiner 206 obtains the time of detection recorded by the example media meter 105.

At block 310, the example database interface 208 obtains the example reference signatures from the example reference database 130. In some examples, the database interface 208 provides the example signature matcher 212 with access to the example reference signatures stored in the example reference database 130.

At block 312, the example reference identifier 210 identifies reference signatures. The reference identifier 210 identifies reference signatures in the example reference database 130 that are associated with reference information corresponding to the watermark data. As described in further detail below, the example flowchart 312 of FIG. 4 represents example instructions that may be implemented to perform the identification of the reference signatures.

At block 314, the example signature matcher 212 determines if any reference signatures were identified by the example reference identifier 210. The signature matcher 212 determines if the reference identifier 210 identified a reference signature or sequence of reference signatures. If the signature matcher 212 does not receive an identified reference signature or sequence of identified reference signatures from the reference identifier 210, then process 300 continues to block 322 at which the example creditor interface 216 credits the media as time-shifted. In some examples, if the signature matcher 212 does not receive an identified reference signature or sequence of identified reference signatures, then the signature matcher 212 does not perform signature matching and does not provide the example viewing type determiner 214 with a successful match. If the signature matcher 212 receives an identified reference signature or sequence of identified reference signatures from the reference identifier 210, then process 300 continues to block 316 at which the example signature matcher 212 performs signature matching.

At block 316, the example signature matcher 212 performs signature matching. In some examples, the signature matcher 212 performs signature matching between the identified reference signature from the example reference identifier 210 and the monitored media signatures from the example media meter 105 of FIG. 1. In some examples, the media meter 105 can generate monitored media signatures associated with the presented media while also decoding the watermarks from the presented media. For example, the monitoring data from the media meter 105 can include monitored media signatures that were generated by the media meter 105 for the presented media that included the watermark. The signature matcher 212 compares the monitored media signatures in the monitoring data to the identified reference signature or sequence of identified reference signatures from the example reference identifier 210. For example, the signature matcher 212 can determine if the monitored media signatures of the monitoring data match the reference data of the identified reference signatures. In some examples disclosed herein, the signature matcher 212 may perform matching using any suitable means (e.g., linear matching, hashed matching, etc.).

At block 318, the example viewing type determiner 214 determines if the signature matching was successful. In some examples, the example viewing type determiner 214 determines that the signature matching was successful when the example signature matcher 212 provides the example viewing type determiner 214 with a matching reference signature or sequence of matching reference signatures from the example reference identifier 210. For example, the viewing type determiner 214 determines that the signature matching was successful when the example signature matcher 212 matches the identified reference signature or sequence of identified reference signatures from the reference identifier 210 to the monitored media signatures from the example media meter 105. In some examples, the example viewing type determiner 214 determines that the signature matching was not successful when the example signature matcher 212 does not provide the example viewing type determiner 214 with a matching reference signature or sequence of matching reference signatures. For example, the viewing type determiner 214 determines that the signature matching was not successful when the example signature matcher 212 does not match the identified reference signature or sequence of identified reference signatures from the reference identifier 210 to the monitored media signatures from the example media meter 105. In some examples, the viewing type determiner 214 determines that the signature matching was not successful if the signature matcher 212 determines that no reference signature or sequence of reference signatures were identified by the example reference identifier 210. If the example viewing type determiner 214 determines that the signature matching was successful, then process 400 continues to block 320 at which the example creditor interface 216 credits the media as live. If the example viewing type determiner 214 determines that the signature matching was not successful, then process 400 continues to block 322 at which the example creditor interface 216 credits the media as time-shifted. In some examples, the viewing type determiner 214 provides the example creditor interface 216 with the live identification or the time-shifted identification for the watermarked media.

At block 320, the example creditor interface 216 credits the media as live. In some examples, the creditor interface 216 generates identification data for the watermarked media based on the output of the example viewing type determiner 214. In some examples, the creditor interface 216 transmits the identification data to the live media creditor 140 of FIG. 1. Once the example creditor interface 216 credits the media as live, process 300 ends.

At block 322, the example creditor interface 216 credits the media as time-shifted. In some examples, the creditor interface 216 generates identification data for the watermarked media based on the output of the example viewing type determiner 214. In some examples, the creditor interface 216 transmits the identification data to the live media creditor 140 of FIG. 1. Once the example creditor interface 216 credits the media as time-shifted, process 300 ends.

FIG. 4 is a flowchart representative of machine readable instructions which may be executed to implement the example reference identifier 210 included in the example meter data analyzer 120 of FIG. 2. The example program 312 of FIG. 4 begins execution at block 402 at which the example reference identifier 210 identifies reference signatures associated with the watermark station identifier. For example, the reference identifier 210 identifies if any reference signatures stored in the reference database 130 are associated with the station identifier of the watermark. In some examples, the reference identifier 210 queries a library of reference signatures for reference signature(s) associated with the station ID of the watermark.

At block 404, the example reference identifier 210 determines if any of the identified reference signatures associated with reference times correspond to the watermark time of detection. In some examples, the reference identifier 210 determines if any of the identified reference signatures having the same station ID as the watermark are associated with a reference timestamp that corresponds to the watermark time of detection. For example, the reference identifier 210 queries the identified reference signatures with the same station ID for a reference signature that is associated with a reference timestamp that represents a media presentation time (e.g., a broadcast time, a download time, etc.) corresponding to the time at which the media meter 105 detected the watermark. In such examples, “corresponding to” refers to the reference timestamp being within a tolerance or threshold of time from the watermark time of detection (e.g., the difference in time between the reference timestamp and the watermark time of detection satisfies the threshold). For example, the tolerance or threshold of time may be within three seconds, five seconds, etc. If the example reference identifier 210 determines that an identified reference signature associated with a reference time corresponds to the watermark time of detection, then process 400 continues to block 406 at which the example reference identifier 210 identifies reference signature with corresponding reference information. If the example reference identifier 210 determines that none of the identified reference signatures associated with the reference times correspond to the watermark time of detection, then process 400 continues to block 408 at which the example reference identifier 210 identifies no reference signatures with corresponding reference information.

At block 406, the example reference identifier 210 identifies the reference signature with corresponding reference information. In some examples, the reference identifier 210 provides the information of the reference signature to the example signature matcher 212. In some examples, the reference identifier 210 identifies a sequence of reference signatures with similar reference information. Once the example reference identifier 210 identifies reference signature with corresponding reference information, process 312 completes and returns to process 300 of FIG. 3.

At block 408, the example reference identifier 210 identifies no reference signatures with corresponding reference information. In some examples, the reference identifier 210 provides the signature matcher 212 with no reference signatures. Once the example reference identifier 210 identifies no reference signatures with corresponding reference information, process 312 completes and returns to process 300 of FIG. 3.

Figure 5:
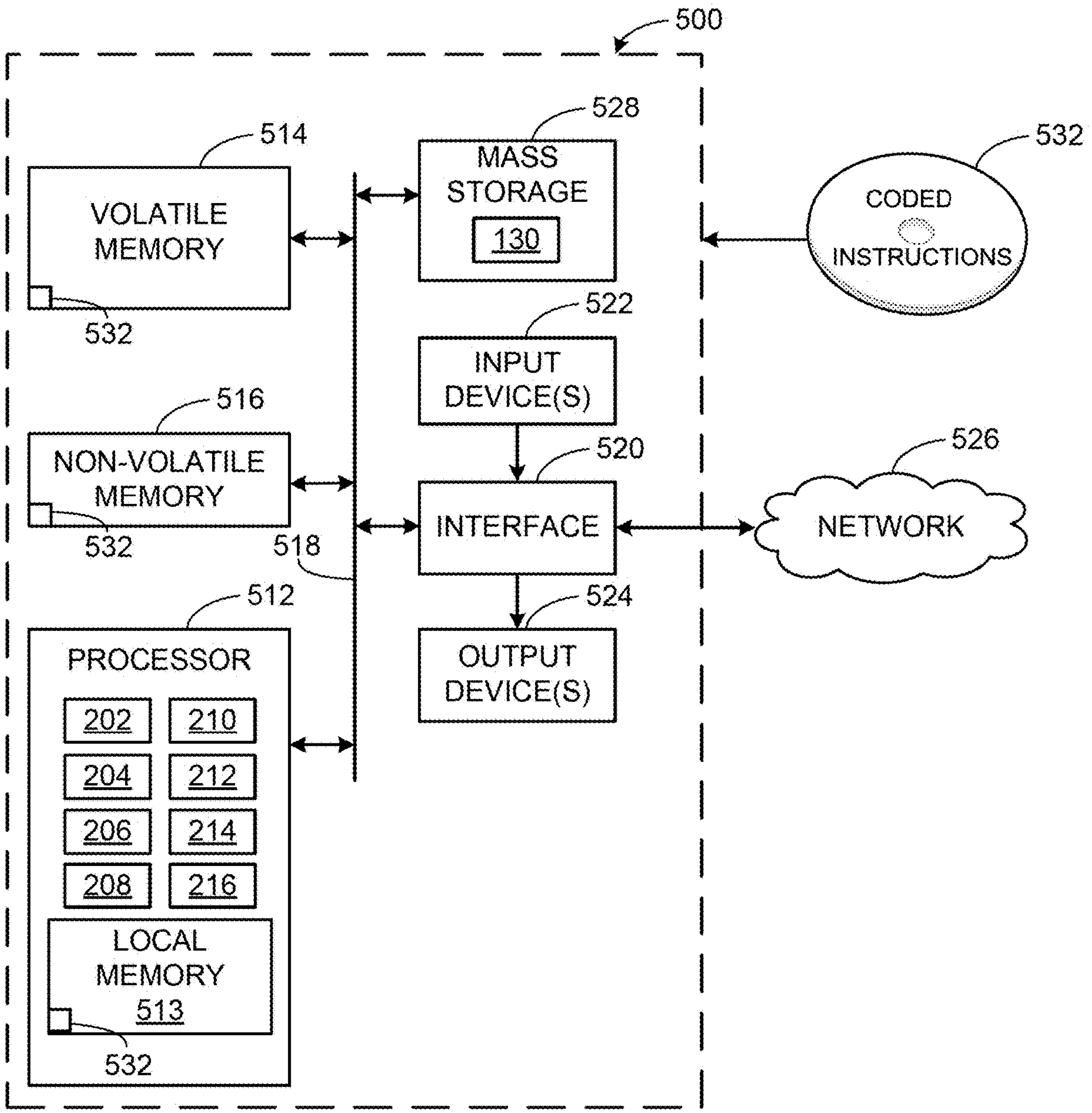
FIG. 5 is a block diagram of an example processing platform structured to execute the instructions of FIGS. 3 and/or 4 to implement the example meter data analyzer of FIGS. 1 and/or 2.

FIG. 5 is a block diagram of an example processor platform 500 structured to execute the instructions of FIGS. 3 and 4 to implement the example meter data analyzer 120 of FIGS. 1 and/or 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network interface 202, the example watermark data segmenter 204, the example detection time determiner 206, the example database interface 208, the example reference identifier 210, the example signature matcher 212, the example viewing type determiner 214, and the example creditor interface 216.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIGS. 3 and 4 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been disclosed that allow for leveraging the information from the detected watermarks in an environment with ambient noise to determine crediting of live and time-shifted media. The disclosed methods, apparatus and articles of manufacture use the watermark data in conjunction with signature matching to determine if the watermark identifies live or time-shifted media. The disclosed examples improve the efficiency of using a computing device by using the station ID and detection time of the watermark to focus the signature matching process. The disclosed methods, apparatus and articles of manufacture are accordingly directed to one or more improvement(s) in the functioning of a computer.

Example methods, apparatus, systems, and articles of manufacture to use station identification to enable confirmation of exposure to live media are disclosed herein. Further examples and combinations thereof include the following:

Example 1 includes an apparatus comprising a watermark data segmenter to determine a media identifier conveyed by a watermark, a detection time determiner to determine a time at which a media meter detected the watermark from a media presentation by a media device, a reference identifier to query a library of reference signatures for a reference signature associated with the media identifier of the watermark and associated with a reference timestamp corresponding to the time at which the media meter detected the watermark, and a viewing type determiner to determine whether the media presentation is live or time-shifted based on whether a result of the query indicates the reference signature does not exist in the library of reference signatures.

Example 2 includes the apparatus of example 1, wherein the reference timestamp corresponds to the time at which the media meter detected the watermark when a difference in time between the reference timestamp and the time at which the media meter detected the watermark satisfies a threshold.

Example 3 includes the apparatus of example 2, wherein the reference timestamp corresponds to a broadcast time or a download time of the reference signature.

Example 4 includes the apparatus of example 1, wherein the viewing type determiner is to determine that the media presentation is time-shifted when the result of the query indicates the reference signature does not exist in the library of reference signatures.

Example 5 includes the apparatus of example 1, the apparatus further including a signature matcher to compare a monitored media signature to an identified reference signature associated with the media identifier of the watermark and associated with the reference timestamp, the monitored media signature included in monitoring data reported by the media meter.

Example 6 includes the apparatus of example 5, wherein the viewing type determiner is to determine that the media presentation is time-shifted when the result of the query indicates the reference signature exists in the library of reference signatures and the identified reference signature does not match the monitored media signature.

Example 7 includes the apparatus of example 5, wherein the viewing type determiner is to determine that the media presentation is live when the result of the query indicates the reference signature exists in the library of reference signatures and the identified reference signature matches the monitored media signature.

Example 8 includes the apparatus of example 1, the apparatus further including a creditor interface to credit media associated with the watermark as live or time-shifted.

Example 9 includes a non-transitory computer readable medium comprising instructions which, when executed, cause a machine to at least determine a media identifier conveyed by a watermark, determine a time at which a media meter detected the watermark from a media presentation by a media device, query a library of reference signatures for a reference signature associated with the media identifier of the watermark and associated with a reference timestamp corresponding to the time at which the media meter detected the watermark, and determine whether the media presentation is live or time-shifted based on whether a result of the query indicates the reference signature does not exist in the library of reference signatures.

Example 10 includes the non-transitory computer readable medium of example 9, wherein the reference timestamp corresponds to the time at which the media meter detected the watermark when a difference in time between the reference timestamp and the time at which the media meter detected the watermark satisfies a threshold.

Example 11 includes the non-transitory computer readable medium of example 9, wherein the instructions cause the machine to determine that the media presentation is time-shifted when the result of the query indicates the reference signature does not exist in the library of reference signatures.

Example 12 includes the non-transitory computer readable medium of example 9, wherein the instructions cause the machine to compare a monitored media signature to an identified reference signature associated with the media identifier of the watermark and associated with the reference timestamp, the monitored media signature included in monitoring data reported by the media meter.

Example 13 includes the non-transitory computer readable medium of example 12, wherein the instructions cause the machine to determine that the media presentation is time-shifted when the result of the query indicates the reference signature exists in the library of reference signatures and the identified reference signature does not match the monitored media signature.

Example 14 includes the non-transitory computer readable medium of example 12, wherein the instructions cause the machine to determine that the media presentation is live when the result of the query indicates the reference signature exists in the library of reference signatures and the identified reference signature matches the monitored media signature.

Example 15 includes a method comprising determining a media identifier conveyed by a watermark, determining a time at which a media meter detected the watermark from a media presentation by a media device, querying, by executing an instruction with a processor, a library of reference signatures for a reference signature associated with the media identifier of the watermark and associated with a reference timestamp corresponding to the time at which the media meter detected the watermark, and determining whether the media presentation is live or time-shifted based on whether a result of the query returns at least one reference signature that satisfies the query.

Example 16 includes the method of example 15, wherein the reference timestamp corresponds to the time at which the media meter detected the watermark when a difference in time between the reference timestamp and the time at which the media meter detected the watermark satisfies a threshold.

Example 17 includes the method of example 15, wherein the determining of whether the media presentation is live or time-shifted includes determining that the media presentation is time-shifted when the result of the query does not return the at least one reference signature that satisfies the query.

Example 18 includes the method of example 15, further including comparing a monitored media signature to an identified reference signature associated with the media identifier of the watermark and associated with the reference timestamp, the monitored media signature included in monitoring data reported by the media meter.

Example 19 includes the method of example 18, wherein the determining of whether the media presentation is live or time-shifted includes determining that the media presentation is time-shifted when the result of the query returns the at least one reference signature that satisfies the query and the identified reference signature does not match the monitored media signature.

Example 20 includes the method of example 18, wherein the determining of whether the media presentation is live or time-shifted includes determining that the media presentation is live when the result of the query returns the at least one reference signature that satisfies the query and the identified reference signature matches the monitored media signature. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A computing system comprising:

a processor; and at least one memory storing instructions that, when executed by the processor, cause the computing system to perform operations comprising:

identifying one or more reference signatures associated with respective reference signature times;

determining whether any of the respective reference signature times correspond to a time of detection of a watermark decoded from media presented by a media device; and determining that the media was live or time-shifted when presented by the media device based on determining whether any of the respective reference signature times correspond to the time of detection of the watermark.

2. The system of claim 1, wherein the operations further comprise:

accessing a media signature associated with the media presented by the media device; and comparing the media signature to the one or more reference signatures.

3. The system of claim 2, wherein the media signature is generated by a meter configured to monitor the media presented by the media device.

4. The system of claim 1, wherein determining that the media was live or time-shifted comprises:

determining, based on a comparison criteria, that the media was live when a media signature matches a first reference signature of the one or more reference signatures, wherein the comparison criteria comprises at least one of a cross-correlation comparison or a Hamming distance comparison.

5. The system of claim 1, wherein the media presented by the media device is streaming media, and the media device is at least one of a smartphone, an Internet-enabled television, a tablet computer, a video game console, or a digital media player.

6. The system of claim 1, wherein the watermark is associated with payload data.

7. The system of claim 6, wherein the payload data comprises a media identifier that is at least one of a broadcast station identifier, a program identifier, or an episode identifier.

8. The system of claim 1, further comprising:

a server comprising a cloud storage service, wherein the one or more reference signatures are accessed from a reference database stored on the cloud storage service.

9. A non-transitory computer readable storage medium having stored thereon program instructions that, upon execution by a processor, cause performance of operations comprising:

identifying one or more reference signatures associated with respective reference signature times;

determining whether any of the respective reference signature times correspond to a time of detection of a watermark decoded from media presented by a media device; and determining that the media was live or time-shifted when presented by the media device based on determining whether any of the respective reference signature times correspond to the time of detection of the watermark.

10. The non-transitory computer readable storage medium of claim 9, wherein the operations further comprise:

accessing a media signature associated with the media presented by the media device; and comparing the media signature to the one or more reference signatures.

11. The non-transitory computer readable storage medium of claim 10, wherein the media signature is generated by a meter configured to monitor the media presented by the media device.

12. The non-transitory computer readable storage medium of claim 9, wherein determining that the media was live or time-shifted comprises:

determining, based on a comparison criteria, that the media was live when a media signature matches a first reference signature of the one or more reference signatures, wherein the comparison criteria comprises at least one of a cross-correlation comparison or a Hamming distance comparison.

13. The non-transitory computer readable storage medium of claim 9, wherein the media presented by the media device is streaming media, and the media device is at least one of a smartphone, an Internet-enabled television, a tablet computer, a video game console, or a digital media player.

14. The non-transitory computer readable storage medium of claim 9, wherein the watermark is associated with payload data.

15. The non-transitory computer readable storage medium of claim 14, wherein the payload data comprises a media identifier that is at least one of a broadcast station identifier, a program identifier, or an episode identifier.

16. A method comprising:

identifying one or more reference signatures associated with respective reference signature times;

determining whether any of the respective reference signature times correspond to a time of detection of a watermark decoded from media presented by a media device; and determining that the media was live or time-shifted when presented by the media device based on determining whether any of the respective reference signature times correspond to the time of detection of the watermark.

17. The method of claim 16, further comprising:

accessing a media signature associated with the media presented by the media device; and comparing the media signature to the one or more reference signatures.

18. The method of claim 17, wherein the media signature is generated by a meter configured to monitor the media presented by the media device.

19. The method of claim 16, wherein determining that the media was live or time-shifted comprises:

determining, based on a comparison criteria, that the media was live when a media signature matches a first reference signature of the one or more reference signatures, wherein the comparison criteria comprises at least one of a cross-correlation comparison or a Hamming distance comparison.

20. The method of claim 16, wherein the watermark is associated with payload data.

* * * * *